(No Model.)

J. S. JENKINS.
PLANTER AND FERTILIZER DISTRIBUTER.

No. 349,799. Patented Sept. 28, 1886.

Witnesses
Percy C. Bowen
H. A. Bernhard

Inventor
John S. Jenkins
By his Attorneys

UNITED STATES PATENT OFFICE.

JOHN S. JENKINS, OF JACKSON, GEORGIA.

PLANTER AND FERTILIZER-DISTRIBUTER.

SPECIFICATION forming part of Letters Patent No. 349,799, dated September 28, 1886.

Application filed November 23, 1885. Serial No. 183,765. (No model.)

*To all whom it may concern:*

Be it known that I, JOHN S. JENKINS, a citizen of the United States, residing at Jackson, in the county of Butts and State of Georgia, have invented new and useful Improvements in Planters and Fertilizer-Distributers, of which the following is a specification, reference being had to the accompanying drawings.

My invention has relation to improvements in combined seed-planters and fertilizer-distributers; and it consists in the peculiar construction and combination of parts, substantially as hereinafter fully set forth, and specifically pointed out in the claim.

My invention has for its object to provide a machine of the class described which shall distribute the seed and fertilizer in a continuous stream; to provide means for opening the furrow to deposit the fertilizer and seed therein, and to cover the same with earth after they have been deposited; to provide means for regulating the discharge of fertilizer and seed, and to cut off the discharge independently of each other; to provide means which shall be simple, strong, light, and durable in construction, thoroughly effective and automatic in operation, and which may be manipulated successfully by a single attendant.

Figure 1:
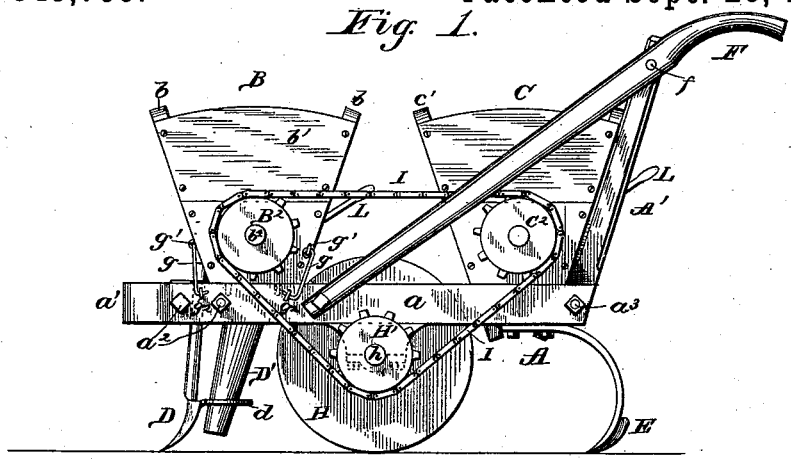
Figure 2:
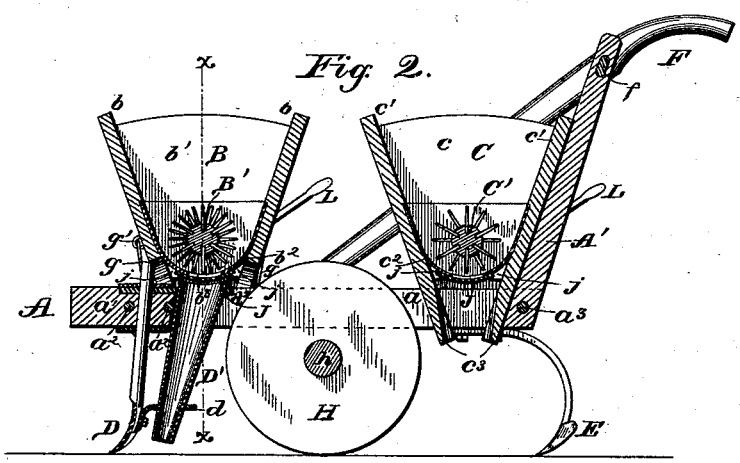
Figures 3, 4:
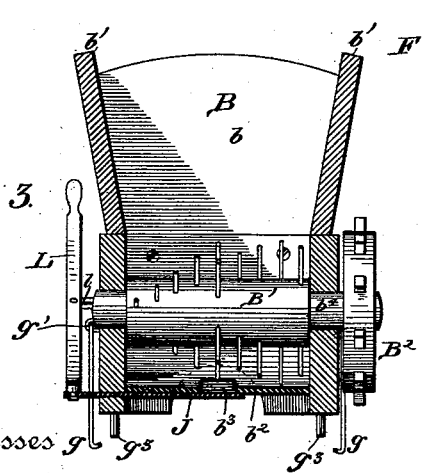

In the accompanying drawings, Figure 1 is a side elevation of a combined seed-planter and fertilizer-distributer constructed in accordance with my invention. Fig. 2 is a longitudinal vertical sectional view. Fig. 3 is a detail sectional view of the fertilizer-hopper on the line $x\ x$ of Fig. 2. Fig. 4 is a rear elevation.

Referring to the drawings, in which like letters of reference indicate corresponding parts in all the figures, A designates the frame of my improved combined fertilizer-distributer and seeder; B, the fertilizer-hopper thereof, secured on the frame at the front end thereof; C, the seed-hopper, secured on the frame at the rear end and in alignment with the fertilizer-hopper B; D, the furrow-opener at the front end of the frame; E, the covering-blades at the rear end thereof, and F the handles by which the machine is guided by the attendant, the peculiar construction and arrangement of the above-mentioned parts being described more fully in detail hereinafter.

The frame A comprises two parallel side bars, $a\ a$, arranged a short distance apart, and having at their front ends a block, $a'$, interposed between them and secured thereto by through-bolts $a^2$.

A' designates a standard or brace arranged at the rear end of the frame, the lower end of the brace A' being enlarged and fitted between the rear ends of the parallel side bars, $a$, and secured thereto by through-bolts $a^3$. The upper end of said brace-standard A' is rigidly secured to a cross-bar, $f$, connecting the two handles F of the machine, the lower ends of said handles being bolted to the side bars, $a$, of the frame A at or near their middle.

The furrow-opener D is suspended from and rigidly secured to the block $a'$ of the frame, and at its rear face it has a guide or loop, $d$, rigidly secured, for the reception of a fertilizer-distributer conducting-tube D', which is arranged at its upper end immediately beneath the discharge-port of the fertilizer-hopper B, and is secured in an eye or loop, $d^2$, rigidly secured to the rear surface of the block $a'$. (See Fig. 2.)

The covering-blades E are of the usual or any preferred form, and are bolted or otherwise secured to the rear ends of the side beams, $a$, of the frame.

The fertilizer-hopper B is arranged at the front end of the frame A, and comprises inwardly-sloping end and side walls, $b\ b'$, a curved bottom, $b^2$, having a discharge-port, $b^3$, therein and secured to the end walls, $b$, and a distributing or agitating drum or cylinder, B', provided with spirally-arranged teeth and rotatively mounted on its shaft $b^4$ in the side walls of the hopper, one end of said shaft being extended beyond the hopper-walls, and having a driving sprocket-wheel, $B^2$, rigidly secured thereon to rotate the toothed cylinder. The hopper B is detachably mounted on the frame A, the lower edges of its side and end walls resting on the beams $a$ and block $a'$, and said hopper is provided with fastening-links $g$ at each corner thereof, and pivotally connected at their upper ends to eyes $g'$, secured to the hopper, and adapted to engage eyes $g^2$, secured to the side beams, $a$, of the frame at proper intervals. $g^3$ designates pins or studs preferably secured to the hopper-walls and entering sockets in the frame A, to prevent lateral displacement of said hopper.

The seed-hopper C, arranged at the rear end of the frame A, is similar in its construction to the fertilizer-hopper B—that is to say, it has sloping side and end walls, $c\ c'$, a curved bottom, $c^2$, having a discharge-port, and an agitating toothed cylinder or drum, C', secured on a shaft journaled in the side walls of the hopper, above the bottom, and having a driving sprocket-wheel, $C^2$. The hopper C is rigidly secured or bolted to the frame A, and the end walls, $c'$, thereof are extended below the plane of the bottom and the beams $a$, as at $c^3$, and are preferably concaved or hollowed out on their inner faces, to provide a conducting spout or tube for the seed from the hopper to the earth.

H designates a driving-wheel arranged between the side bars, $a$, and the hoppers, and secured on a shaft, $h$, journaled in bearings or boxes $h'$, rigidly secured to the under faces of the side beams, $a$, said shaft having a sprocket-wheel, H'.

I designates a drive-chain of sprocket form, passing over the wheels H', $B^2$, and $C^2$, and rotating them, the motion being derived from the rotating wheel H, and communicated through the chain I to the sprocket-wheels of the agitating-drums B' C' of the fertilizer and seed hoppers. By means of the revolving agitating-drums B' C' the fertilizer and seed are kept in a state of constant agitation when the machine is in motion, and are forced in continuous streams from the hoppers.

J designates a valve or cut-off arranged to slide beneath the curved bottoms of the hoppers, said slide or valve being also curved transversely to conform to the shape of the hopper-bottoms, and fitting at their edges in grooved guide-blocks $j$, secured to the bottoms and end walls of said hoppers. The outer end of each slide or valve is pivoted to the lower end of an operating-lever, L, arranged at one side of the hopper and pivoted at or near its middle to a support, $l$.

The operation of my invention will be readily understood from the foregoing description, taken in connection with the drawings.

It will be observed that one or both of the hoppers can be thrown out of use by merely shifting the levers L and adjusting the seed slides or valves to correspond; that the drive-wheel serves efficiently to rotate the agitating-drums, it being revolved by frictional contact with the ground when the machine is in motion, and that my improved machine is simple, strong, and light in construction, thoroughly effective, easy and automatic in operation, and can be operated with a minimum of power.

I lay no claim, broadly, to simultaneously operating the toothed drums or cylinders in a fertilizer and a distributing hopper, and to a sliding valve in the hopper controlled by a lever, nor to detachably mounting a hopper on a frame, but claim only the particular construction and arrangement of improved devices specifically set out in the claim, whereby the more effectual dropping of the seed and fertilizer is attained, and economy in the structure of the machine is secured.

Having thus fully described my invention, what I claim as new, and desire to secure by Letters Patent, is—

As an improvement in combined seed-planters and fertilizer-distributers, the combination of the frame A, having the side beams and the handles, an upright, A', fitted between the rear ends of the side beams of the frame and secured directly thereto, a removable fertilizer-hopper, B, arranged at the front end of the frame, and having the dowel-pins $g^3$ and the pivoted hooks $g$, a seed-hopper, also mounted on the frame in rear of and in alignment with the fertilizer-hopper, and having its end walls inclined and extended beneath the frame and curved or inclined, as at $c^3$, on their opposing faces to form a discharge-spout, the opening-blades D, the delivering-tube D' to the fertilizer-hopper, and having the strap $d$ encircling the same, a drive-wheel, H, intermediate of the hoppers and having a sprocket-wheel, the toothed cylinders B' C', journaled in the hoppers and having their shafts provided with sprocket-wheels $B^2\ C^2$, a drive-chain encompassing the said sprocket-wheels of the cylinder and drive-wheels, the sliding valves J, fitted beneath and curved concentric with the hopper-bottoms, and the pivoted levers L, for independently operating the valves, all arranged and combined for service substantially as herein shown and described.

In testimony that I claim the foregoing as my own I have hereto affixed my signature in presence of two witnesses.

JOHN S. JENKINS.

Witnesses:
O. S. DUPE,
L. D. WATSON.